INVENTOR.
VERNON L. NEWHOUSE
BY Morris A. Rabkin
ATTORNEY

INVENTOR.
VERNON L. NEWHOUSE
BY Morris B. Rabkin
ATTORNEY 2,957,165

MAGNETIC SYSTEMS

Vernon L. Newhouse, Moorestown, N.J., assignor to Radio Corporation of America, a corporation of Delaware Filed May 13, 1955, Ser. No. 508,158

12 Claims. (Cl. 340—174)

This invention relates to systems in which information in digital form is represented by the residual magnetic states of magnetic elements, and particularly to magnetic devices for performing logical, switching, or storage functions required in such digital systems.

Magnetic devices and systems for information handling have been developed that employ magnetic cores made of material having a substantially rectangular hysteresis characteristic. These magnetic systems have the advantages of indefinite life, small size, relatively small power supply, and the ability to store information indefinitely. Among such magnetic systems that have been developed are magnetic shift registers. In magnetic shift registers, binary information is stored in magnetic cores in the form of the residual flux of the cores, which flux may assume either one of two directions. The cores are coupled in series by means of a separate temporary storage between each adjacent pair of cores. Information is stepped along to successive cores by means of shift pulses applied to the cores. The binary information is stored during the shift in the temporary storage units. An example of a magnetic shift register is described in the copending patent application Serial No. 440,718, filed July 1, 1954, by this applicant and assigned to the same assignee.

It is among the objects of this invention to provide:

A new and improved magnetic device that may be used in digital systems;

An improved magnetic device for handling digital signals that may be operated at relatively high speeds;

An improved magnetic device that is simple and reliable and in which noise signals are substantially eliminated;

An improved and simple magnetic system that may be employed as a stepping register or ring counter.

In accordance with this invention, input, output, and advance windings are linked to a plurality of saturable magnetic cores having an ordinal relationship. The output winding of each core is coupled to the input winding of the succeeding core through a circuit that includes at least one unilateral impedance. An impedance connected in circuit with the advance windings is employed to develop a bias voltage during the application of advance pulses to the advance windings. This bias voltage is applied to certain ones of the unilateral impedances to control the flow of information to preceding or succeeding cores, or both, during the advance operation. Also, in accordance with this invention, means are provided for applying a bias to the unilateral impedances to suppress noise signals.

Figures 1, 2:
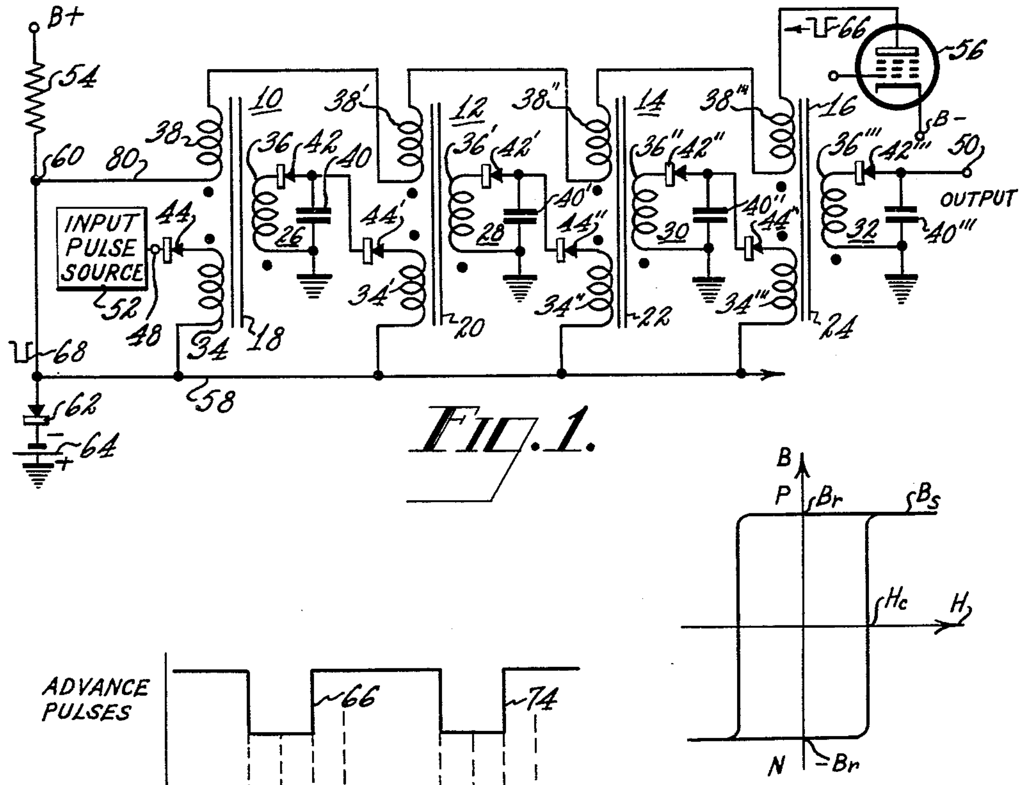
Figure 1 is a schematic circuit diagram of an embodiment of this invention in which magnetic units are connected in a magnetic stepping register.
Figure 2 is an idealized graph of a rectangular hysteresis characteristic of magnetic cores that may be employed in this invention.

Shown in Figure 1 is a stepping register made up of a series of magnetic units or stages 10 to 16. The units 10 to 16 are the same, and include, respectively, magnetic cores 18 to 24 and coupling circuits 26 to 32. Only the first unit 10 is described in detail. Corresponding parts in the second, third, and fourth stages 12, 14, and 16 are referenced by the same numerals with the addition of a prime ('), double prime (") and triple prime ('''), respectively.

The magnetic cores 18 to 24 are preferably made of a material having a substantially rectangular hysteresis curve of the type shown in Figure 2. Desirable characteristics of the core material are a high saturation flux density $B_s$, a high residual flux density $B_r$ substantially equal to $B_s$, and a low coercive force $H_c$. Opposite magnetic states or directions of flux in a core are represented by P and N. If a magnetizing force tending to change the flux to direction N is applied to a core which is already in state N, a relatively small change in the core flux density takes place. Ideally, if the magnetizing force in a flux reversing direction is less than the coercive force, the flux density does not change, and the residual magnetism is substantially unchanged. In practice the magnetic cores are sufficiently close to the ideal to have two stable remanent states.

Linked to the first core 18 are an input winding 34, an output winding 36, and an advance or read-out winding 38. The relative directions of linkage or polarities of the windings are indicated by dots next to terminals of the windings in accordance with the usual transformer convention. The coupling circuit 26 is connected between the output winding 36 of the first core 18 and the input winding 34' of the succeeding core 20 in the series. The coupling circuit 26 includes a capacitor 40 connected across the output winding 36 and connected at one terminal to a reference potential or common conductor indicated by the conventional ground symbol. The other terminal of the capacitor 40 is connected through a charge diode 42 to the unmarked terminal of the output winding 36 and also through a discharge diode 44' to the marked terminal of the input winding 34' of the succeeding core 20. The diodes 42, 44' are poled, respectively, to pass negative pulses from the output winding 36 unmarked terminal to the capacitor 40, and negative pulses from the capacitor 40 to the marked terminal of the succeeding input winding 34'. A resistor (not shown) may be connected in shunt with the diode 42 or the capacitor 40 to provide a slow discharge path for the capaictor 40.

An input terminal 48 is connected through the diode 44 to the marked terminal of the first core 18 input winding 34. An output terminal 50 is connected to the capacitor 40''' of the last core coupling circuit 32 at the junction to the diode 42'''. The output terminal 50 may be connected to a load circuit (not shown) provided by any appropriate utilization device such as the input of another magnetic unit. An input signal source 52 is connected to the input terminal 48. The input source 52 may be the output of another magnetic unit (not shown) or a capacitor or other suitable current or charge storage means. For example, the output terminal 50 may be connected directly to the input terminal 48 to provide a ring counter.

The advance windings 38 of all the units 10 to 16 are connected in series with each other (unmarked terminal of one to marked terminal of the succeeding stage) and with a load resistor 54, all between a source of operating potential B+ and an advance current pulse source 56. The source 56 may be any appropriate form of current generator such as a pentode. The unmarked terminals of all the input windings 34 to 34‴ are connected to a bus 58 which, in turn, is directly connected to the junction 60 of the resistor 54 and the first advance winding 38. The anode of a diode 62 is connected to the junction 60. The negative terminal of a direct voltage source 64 to provide a bias is connected to the cathode of this diode 62. The positive terminal of the source 64 is returned to ground.

Successive pulses are applied to the grid of the pentode 56 from any appropriate timing pulse source (not shown). This tube 56 is rendered conductive by such timing pulses to produce rectangular current pulses 66 in the advance windings 38. These advance pulses 66 are of sufficient amplitude to apply to each core 18 to 24 a magnetizing force in excess of the coercive force $H_c$, indicated in Figure 2. The advance pulses 66 tend to drive all of the cores 18 to 24 to state N. Any input pulse from the source 52 may be applied upon termination of any advance pulse 66. The bus 58 is normally at a negative potential substantially equal to that of the bias source 64, since the forward resistance of the diode 62 is negligible. An advance current pulse 66 produces a voltage pulse 68 across the resistor 54. This pulse 68 is substantially more negative than the bias voltage of the source 64.

Figure 3:
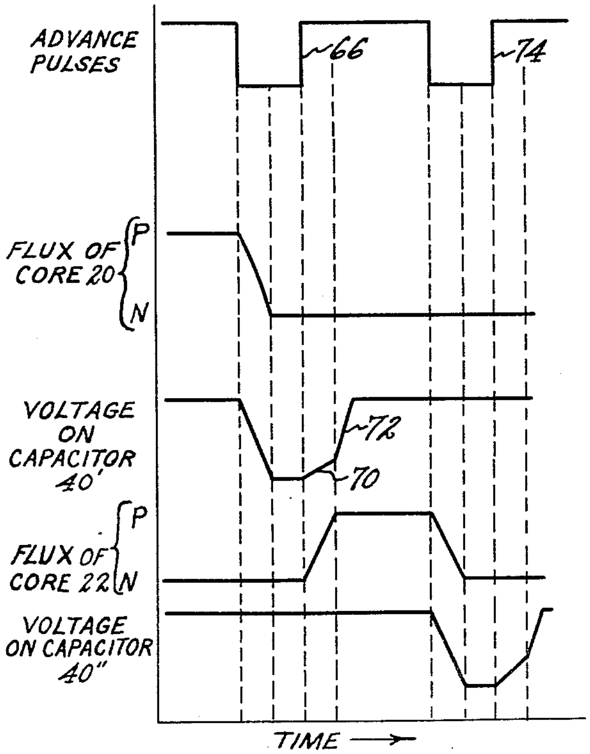
Figure 3 is an idealized graph on the same time base of the waveforms occurring in portions of the circuit of Figure 1.

The shifting of digital information through the stepping register is explained by considering the second core 20 in the P state and all the other cores 18, 22, 24 in the N state. Figure 3 illustrates somewhat idealistically the waveforms that are produced in the shift of the information represented by a P state in the second core 20 to the third core 22.

An advance pulse 66 tends to set every magnetic core 18 to 24 to state N. However, since all but the second core 20 are already in state N, the only flux change associated with the advance pulse 66 occurs in the second core 20. The second core 20 is driven to state N, and a voltage pulse is induced in the second core output winding 36′ which is passed by the diode 42′ to charge the associated storage capacitor 40′ to a negative potential. During the advance pulse 66, the pulse 68 is applied to the bus 58, and, thereby, the bus is maintained at a potential sufficiently negative to prevent discharge of the capacitor 40′ through the discharge diode 44″. Upon termination of the advance pulse 66, the bus 58 is restored to the potential of the bias source 64, and the capacitor 40′ discharges through the diode 44″ to the bias source potential. This discharge of the second unit 12 capacitor 40′ through the input winding 34″ sets the third core 22 in state P. The information represented by the state P is thereby transferred from the second core 20 to the third core 22. The capacitors 40, 40″, 40‴ of the other units 10, 14, 16 were not charged during the advance pulse 66. Therefore, the cores 20 and 24 are in state N upon termination of the pulse 66. Thus, there is effectively a transfer of the state N from the associated preceding cores.

There are two portions of the capacitor discharge which are indicated in the graph of Figure 3 at the waveform bearing the legend "voltage on capacitor 40′." The first portion 70 of this discharge is relatively slow due to the relatively large impedance presented by the winding 34″ during the change of state of the core 22. After the core 22 is saturated in state P, the impedance of the winding 34″ is relatively small, and the second portion 72 of the discharge is fast. Small resistances (not shown) may be connected in the respective discharge paths of the capacitors through the discharge diodes 44 in order to limit the discharge current corresponding to the portion 72 to a value within the current carrying capacity of these discharge diodes 44.

During the advance pulse 66 which reverses the state of the second core 20 of Fig. 1, a pulse is induced in the second core 20 input winding 34′, which pulse tends to pass in the forward direction through the discharge diode 44′ connected to that input winding 34′. However, at the same time, the negative pulse 68 is applied to the bus 58 to hold the bus at a potential sufficiently negative to cut off the diode 44′ and prevent the passage of the pulse induced in the winding 34′ back to the capacitor 40 of the first unit 10. By this arrangement undesired backward flow of information to preceding cores is prevented.

The next advance pulse 74 restores the core 22 to state N. As illustrated by the waveforms of Fig. 3, the capacitor 40″ is charged negatively at that time. Upon termination of the advance pulse 74, the capacitor 40″ discharges through the diode 44‴ and the winding 34‴ to set the fourth core to state P. This operation is repeated for each advance pulse, in effect, which causes transfer of the state of each core to its associated succeeding core. The output signals may be taken at the terminal 50 across the capacitor 40‴. Where the output device (not shown) does not include means for discharging the capacitor 40‴ periodically, another discharge diode (not shown) and a small series resistance (not shown) may be connected between the terminal 50 and the bus 58. Thereby, the capacitor 40‴ may be periodically discharged in a manner similar to the manner of discharge of the other capacitors.

The magnetic materials used for the core may have hysteresis loops which depart considerably from the ideal rectangular hysteresis loop shown in Figure 2. The residual flux density $B_r$ in such non-rectangular loop materials may be substantially less than the saturated flux density $B_s$, as indicated graphically in Figure 4. A core of such non-rectangular loop material at remanence in state N is in a state corresponding to point $N_2$ of Figure 4. An advance pulse 66 drives the core further into saturation to point $N_1$ causing a "noise" flux change and inducing a small noise pulse 76, illustrated in Fig. 5, in the output winding of the core. A second pulse 78, illustrated in Fig. 5, of opposite polarity is induced in the output winding upon termination of the advance pulse 66 and the return of the core to its remanent state $N_2$. It is believed that the state of the core, as represented by a point on the characteristic, actually traverses a minor hysteresis loop, not fully shown in Fig. 4. The amplitude of the noise pulse 76 is affected by mutual inductance between the windings as well as by the non-rectangular hysteresis curve of the core materials.

Figure 4:
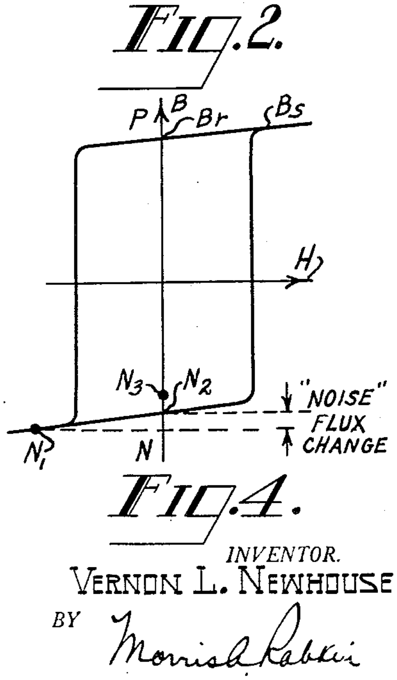
Figure 4 is a graph of a non-rectangular hysteresis characteristic of magnetic cores that may be employed in this invention.
Figure 5:
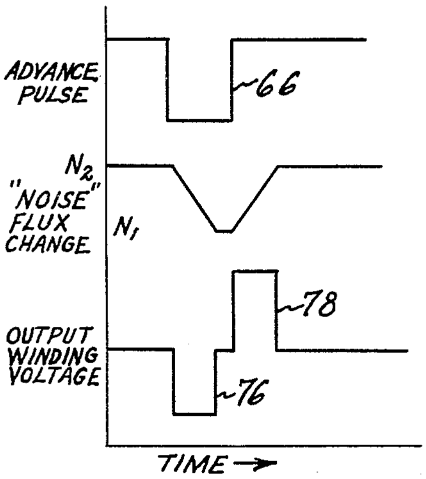
Figure 5 is an idealized graph on the same time base of waveforms that are produced with cores having a non-rectangular hysteresis characteristic.

All of the cores which are in state N induce these "noise" voltage pulses 76, 78 when an advance pulse 66 is applied. If the diodes such as 42 and 44′ are not biased in the reverse direction, the negative pulse 76 would charge the associated capacitor 40. The effect of a subsequent discharge of this capacitor 40 would tend to drive the succeeding core to a remanent state $N_3$ (Figure 4). This effect tends to be cumulative. Consequently, the noise pulse 76 tends to become larger in amplitude with each successive stage until it may become sufficiently large to drive a core to state P and, thereby, generate spurious information.

The generation of such spurious information is prevented by the negative bias applied to the bus 58 from the source 64. The capacitor 40 does not discharge completely upon termination of an advance pulse 66 but, rather, discharges to approximately the negative voltage of the source 64. Consequently, a reverse negative bias voltage is applied to anode of the charge diode 42, which bias voltage is approximately equal to the maximum expected amplitude of any of the noise pulses 76. This bias effectively blocks the passage of noise pulses 76 to the capacitor 40 and prevents the transmission of such pulses to the succeeding core input winding 34'. The positive noise pulses 78 are blocked by the back impedance of the diode 42.

The reverse bias on diodes 42 and 44' ensures that these diodes remain cut off during the quiescent state of the circuit. Consequently, magnetizing currents, which would tend to bias the cores, do not flow through the input or output windings during quiescence.

Figure 6:
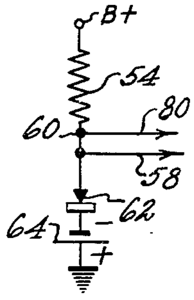
Figure 6 is a schematic circuit diagram of a portion of the circuit of Figure 1.

The biasing portion of the circuit of Figure 1 is shown separately in Figure 6. A qualitative explanation of the operation of this biasing circuit is offered. In the quiescent state, no advance pulse current is drawn through the conductor 80 to the advance windings 38, and no discharge current is drawn through the bus 58. When the current drawn through the bus 58 to discharge one of the capacitors is less than the quiescent current through the diode 62, the voltage at the bus 58 remains substantially at the quiescent bus voltage, which is approximately equal to the voltage of the source 64. Thus, during capacitor discharge, the bias circuit functions as a low impedance voltage source connected to the negative voltage of the source 64. However, when an advance pulse 66 is applied, the current drawn through the conductor 80 is greater than the quiescent current through the diode 62. Consequently, the voltage at the bus 58 is negative with respect to the source 62, and the diode 62 is cut off. Thus, the desired biasing of the diodes 42 and 44' is achieved during quiescence and during an advance pulse 66, and the effective impedance through which the capacitor 40 discharges is low.

Because of the low resistances in the charge and discharge paths of the capacitor 40, high operating speeds of the circuit are possible, for example, of the order of kilocycle pulse rates. The capacitor 40 may be made quite large, which permits three or more cores to be driven from the single capacitor. In such an arrangement, the discharge path from the single capacitor is through a discharge diode and the input windings of the cores to be driven, all connected in the same series circuit, to the bias bus. Thus, the single capacitor discharges through the input windings to turn over all of the cores. The stepping register of Figure 1 may be employed to carry out various switching and logical operations in computer circuits and the like such as in the circuits described in the aforementioned patent application Serial No. 440,718.

Figure 7:
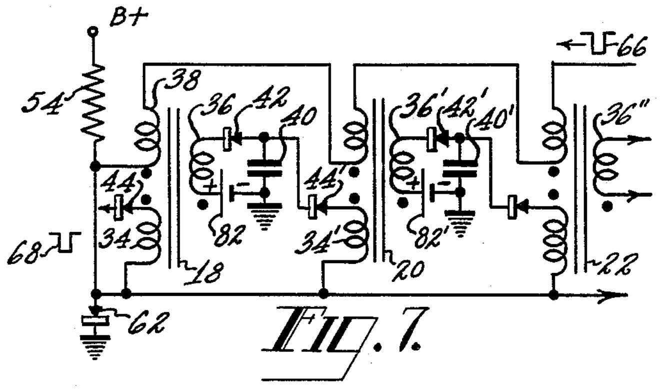
Figure 7 is a schematic circuit diagram of a modification of the circuit of Figure 1.

A modification of the circuit of Figure 1 is shown in Figure 7. Parts previously described are referenced by the same numerals in the circuit of Figure 7 and operate in a manner that will be understood from the preceding description. The diode 62 is returned to ground. Therefore, the capacitor 40 discharges to ground potential. A reverse bias is applied to the anode of the diode 42 by means of the direct voltage source 82 connected in series with the output winding 36 between the anode of the diode 42 and ground.

The amplitude of the bias voltage provided by the source 82 is preferably approximately equal to the amplitude of the noise pulses 76. As a result of this reverse bias on the diode 42, noise pulses 76 are effectively blocked and do not affect the magnetic state of the succeeding core.

Figure 8:
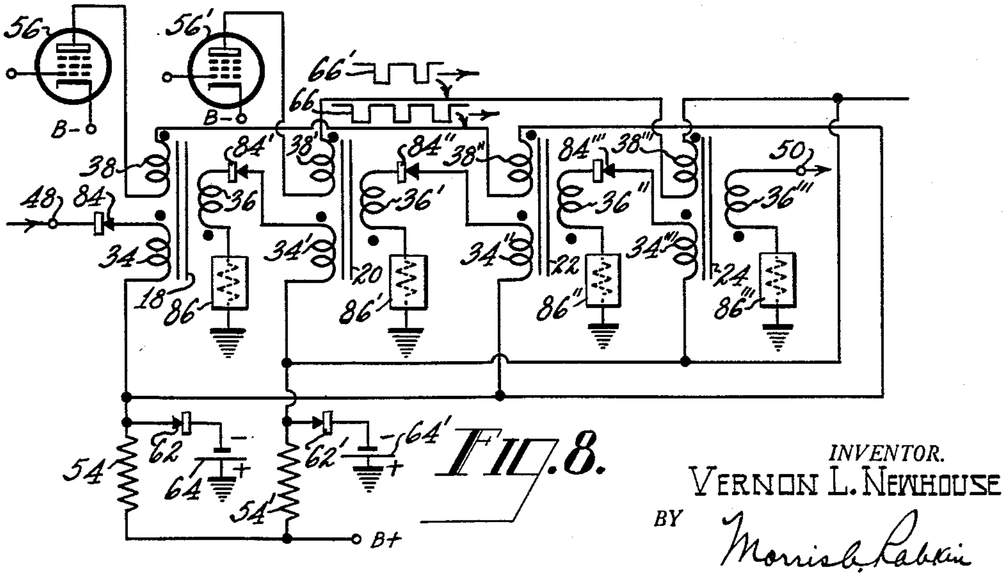
Figure 8 is a schematic circuit diagram of another embodiment of this invention.

In Figure 8, another stepping register embodying this invention is shown. Corresponding parts previously described are referenced by the same numerals. In this register, the advance windings 38 and 38'' of the alternate cores 18 and 22 are connected in a series circuit with a load resistor 54. The series circuit is connected between an advance current pulse source 56 and B+. The advance windings 38' and 38''' of the cores 20 and 24 are connected in a second series circuit with a second load resistor 54'. This second series circuit is connected between a second advance current pulse source 56' and B+. The sources 56 and 56' supply advance current pulses 66 and 66' alternately.

Separate diodes 62 and 62' and separate bias sources 64 and 64' are connected to the resistors 54 and 54', respectively, to form bias circuits in the manner described above with respect to Figure 1. The input windings 34 and 34'' of the alternate cores 18 and 22 are each connected at one terminal to the bias circuit of the resistor 54. The input windings 34' and 34''' are each connected at its unmarked terminal to the bias circuit of the resistor 54'. A diode 84 is connected between the input terminal 48 and the marked terminal of the input winding 34. A load impedance 86 (indicated by a resistor shown in broken lines) is connected between the marked terminal of the output winding 36 and ground. The load impedance may be a winding on a magnetic element (not shown) in another circuit. The unmarked terminal of the output winding 36 is connected through the diode 84' to the marked terminal of the input winding 34'. Succeeding stages are coupled in the same manner. The output terminal 50 connected to the output winding 36''' may be connected directly to the input terminal 48 to provide a ring counter. The loads 86 to 86''' may be separate signal channels that are pulsed successively as the ring counter assumes successive conditions.

When the circuit is used as a stepping register, alternate cores store information, and the other alternate cores are used as temporary storage or transfer cores. As initial conditions, the second core 20 is assumed to be in state P and the other cores 18, 22, 24 in state N. The advance pulse 66 of the first cycle of advance pulses drives the first and third cores 18 and 22 further into state N and does not affect the cores 20 and 24. Thus, there is no change in the conditions of the circuit. The second advance pulse 66' of the first cycle drives the second core 20 from state P to state N. The resulting voltage induced in the output winding 36' draws current through the load 86', through the input winding 34'', and through the diode 84'' in the forward direction. The circuit for this transfer current is completed through the bias circuit of the resistor 54, which is not affected by the second advance pulse 66'. This current flowing in the input winding 34'' drives the third core from state N to state P.

With the change of the third core 22 to state P, a voltage is induced in the output winding 36'', which voltage is blocked by the back impedance of the diode 84''. As the second core 20 is returned to state N by the first-cycle second advance pulse 66', a voltage is induced in the input winding 34', which voltage tends to draw current in the forward direction through the diode 84'. However, at the same time, this second advance pulse 66' produces a large voltage drop across the resistor 54' to bias the diode 84' in the back direction and prevent such backward flow of information.

The first advance pulse 66 of the second cycle of advance pulses restores the third core 22 to state N and advances the state P to the fourth core. This second-cycle first advance pulse 66 through the resistor 54 biases the diode 84'' in the reverse direction to block a transfer in the back direction of a pulse induced in the input winding 34''.

The biasing circuit of the source 64', the diode 62', and the resistor 54' serves to bias the diodes 84' and 84''' in the back direction during quiescence. Thereby, noise pulses are blocked that are induced in the output windings 36 and 36'' during a first advance pulse 66, in a manner similar to the biasing circuit of Figure 1. Likewise, the biasing circuit of the source 64, the diode 62, and the resistor 54 bias the diodes 84 and 84'' in the back direction.

When the second core 20 is changed from state P to state N the transfer current through the diode 84'' flows as the useful current in the load impedance 86'. When the turns ratio of the output winding 36' to the input winding 34'' is made high (for example, a ratio of more than three or four to one), the second core 20 may be considered to operate as a current transformer. Therefore, the magnitude of the transfer current through the load 86' is controlled almost solely by the magnitude of the advance current pulse 66'. The core 20 acts as a current transformer until the core 22 reaches saturation in state N. If the advance pulse 66' is a constant current pulse, the transfer current in the load 86' is approximately a constant current pulse if the load is small. The relatively small number of turns in the input winding 34' act as a small load. At the beginning of the transferred current pulse, the third core 22 offers a back voltage that limits the transfer current somewhat. But as soon as the third core 22 is changed to state P, the only load in the transfer current circuit is that of the load 86' and the biasing circuit of the resistor 54. The other stages operate in a similar manner. Thus, this circuit is capable of delivering a large constant current pulse to a heavy load at each of the stages of the circuit. The amplitude of the load pulse may be controlled by the amplitude of the advance pulse.

Thus, a new and improved magnetic stepping register or ring counter that may be used in digital systems is provided. The register may be operated at relatively high speeds, and noise signals are substantially eliminated.

What is claimed is:

1. A magnetic system comprising a plurality of magnetic elements having an ordinal relationship and made of a material having a substantially rectangular hysteresis characteristic, input, output, and advance windings linked to each of said elements, an impedance common to said advance windings, means for applying current pulses to said advance windings and said impedance in series, separate means each including a unilateral impedance coupling said output winding of each of said elements to the input winding of the succeeding order element, and means for applying voltage pulses developed across said common impedance during said current pulses to said unilateral impedances to bias said unilateral impedances in the reverse direction during the application of said current pulses, said voltage pulse applying means including means for applying a reverse biasing voltage of lesser magnitude than said voltage pulses to said unilateral impedance in the absence of said current pulses.

2. A circuit comprising a plurality of magnetic elements having an ordinal relationship and made of a material having a substantially rectangular hysteresis characteristic, input, output, and advance windings linked to each of said elements, a first impedance common to alternate ones of said advance windings and a second impedance common to the others of said advance windings, first means for applying first current pulses to said advance windings of said alternate ones of said elements and said first impedance in series, second means for applying second current pulses to said advance windings of the said others of said elements and said second impedance in series, a different unilateral impedance coupling said output winding of each of said elements to the input winding of the succeeding order element, first means for applying voltage pulses developed across said first impedance during said first current pulses to said unilateral impedances connected to said alternate element input windings in a reverse biasing direction, and second means for applying voltage pulses developed across said second impedance to said unilateral impedances connected to said other element input windings in a reverse biasing direction.

3. A magnetic system comprising a plurality of magnetic elements having an ordinal relationship and made of a material having a substantially rectangular hysteresis characteristic, separate input, output, and advance windings linked to each of said elements, a common impedance, means for applying current pulses to said advance windings and said common impedance in series, a diode connected at one terminal to said common impedance and in shunt with respect to said advance windings, means for applying a reference potential to the other terminal of said diode, separate means each including a diode coupling said output winding of each of said elements to said input winding of the succeeding order element, and means connecting said one diode terminal to said coupling diodes.

4. A circuit comprising a plurality of magnetic elements operatively arranged in order and made of a material having a substantially rectangular hysteresis characteristic; separate input, output, and advance windings linked to each of said elements; a common impedance; means for applying current pulses to said advance windings and said common impedance in series; separate means coupling said output winding of each of said elements to said input winding of the succeeding order element; each of said coupling means including two diodes poled in the same direction and connected in series between the associated ones of said output and input windings, and a capacitor connected to the junction of said diodes and in shunt with respect to the associated ones of said output and input windings; means for applying voltage pulses developed across said common impedance during said current pulses to one of said diodes of each of said coupling means in a reverse biasing fashion to control the transfer of signals from said output to said input windings of adjacent order elements; another diode connected at one terminal to said common impedance and in shunt with respect to said advance windings, and means for applying a reference potential to the other terminal of said diode, and wherein said voltage pulse applying means is connected to said one terminal of said another diode.

5. A circuit as recited in claim 4 wherein said reference potential provides a reverse bias for said coupling means diodes of lesser magnitude than the reverse bias provided by said voltage pulses.

6. A circuit comprising a plurality of magnetic elements having an ordinal relationship and made of a material having a substantially rectangular hysteresis characteristic, separate input, output, and advance windings linked to each of said elements, a first and a second impedance, first means for applying first current pulses to said advance windings of alternate ones of said elements and said first impedance in series, second means for applying second current pulses to said advance windings of the other of said elements and said second impedance in series, a first diode connected at one terminal to said first impedance and in shunt with respect to said advance windings of said alternate elements, a second diode connected at one terminal to said second impedance and in shunt with respect to said advance windings of said other elements, means for applying a reference potential to the other terminals of said diodes, separate means each including a diode coupling said output winding of each of said elements to said input winding of the succeeding order one of said elements, first means connecting said first diode one terminal to said coupling diodes coupled to said alternate element input windings, and second means connecting said second diode one terminal to said coupling diodes coupled to said other element input windings.

7. A circuit as recited in claim 6, wherein said separate coupling means each further includes a load impedance connected in series with the associated coupling diode.

8. In combination, a plurality of magnetic memory cores, each capable of assuming one of two stable states; storage means; a charge circuit for said storage means including an output winding on one core and a first switch in series with said winding; a discharge circuit for said storage means including an input winding on another core and a second switch in series with said input winding; and means for maintaining said second switch open during the charge of said storage means and for maintaining said first switch open upon discharge of said storage means to its quiescent value.

9. In combination, a plurality of magnetic memory cores, each capable of assuming one of two stable states; storage means; a charge circuit for said storage means including an output winding on one core and a diode in series with said winding; a discharge circuit for said storage means including an input winding on another core and a second diode in series with said input winding; and means for reverse biasing said second diode during the charge of said storage means and for reverse biasing said first diode upon discharge of said storage means to its quiescent value.

10. In combination, a plurality of magnetic memory cores, each capable of assuming one of two stable states; storage means; a charge circuit for said storage means including an output winding on one core and a diode in series with said winding; a discharge circuit for said storage means including an input winding on another core and a second diode in series with said input winding; means for reverse biasing said second diode at a relatively high level during the charge of said storage means; and means for reversing biasing said first and second diodes at a lower level upon discharge of said storage means to its quiescent value.

11. In combination, a plurality of magnetic memory cores, each capable of assuming one of two stable states; storage means; a charge circuit for said storage means including an output winding on one core and a diode in series with said winding; a discharge circuit for said storage means including an input winding on another core, a second diode in series with said input winding, and a source of reverse bias voltage; means for maintaining said second diode cut off during the charge of said storage means including means for substantially increasing the reverse bias voltage applied to said second diode; and means for maintaining said first diode cut off upon discharge of said storage means including said first-named source of reverse bias voltage which prevents said storage means from fully discharging through said second diode, whereby the charge remaining on said storage means reverse biases said first diode.

12. In the combination as set forth in claim 10, said storage means comprising a capacitor.

References Cited in the file of this patent

UNITED STATES PATENTS

| | | |
|---|---|---|
| 2,652,501 | Wilson | Sept. 15, 1953 |
| 2,683,819 | Rey | July 13, 1954 |
| 2,708,722 | An Wang | May 17, 1955 |
| 2,753,545 | Lund | July 3, 1956 |
| 2,822,532 | Thompson | Feb. 4, 1958 |
| 2,825,890 | Ridler et al. | Mar. 4, 1958 |

FOREIGN PATENTS

| | | |
|---|---|---|
| 730,165 | Great Britain | May 18, 1955 |